United States Patent
Agrawal et al.

(10) Patent No.: US 9,800,542 B2
(45) Date of Patent: Oct. 24, 2017

(54) IDENTIFYING NETWORK FLOWS UNDER NETWORK ADDRESS TRANSLATION

(71) Applicant: International Business Machines Corporation, Armonk, NY (US)

(72) Inventors: Dakshi Agrawal, Monsey, NY (US); Bong Jun Ko, Harrington Park, NJ (US); Thai Franck Le, White Plains, NY (US); Robert B. Nicholson, Southsea (GB); Vasileios Pappas, Elmsford, NY (US); Dinesh C. Verma, New Castle, NY (US)

(73) Assignee: International Business Machines Corporation, Armonk, NY (US)

(*) Notice: Subject to any disclaimer, the term of this patent is extended or adjusted under 35 U.S.C. 154(b) by 437 days.

(21) Appl. No.: 13/829,177

(22) Filed: Mar. 14, 2013

(65) Prior Publication Data
US 2014/0280825 A1 Sep. 18, 2014

(51) Int. Cl.
*G06F 15/173* (2006.01)
*H04L 29/12* (2006.01)

(52) U.S. Cl.
CPC .................. *H04L 61/2514* (2013.01)

(58) Field of Classification Search
USPC ....... 709/203, 206, 217, 219, 223, 224, 226, 709/228, 231, 232, 238; 370/234, 389, 370/392
See application file for complete search history.

(56) References Cited

U.S. PATENT DOCUMENTS

| | | | |
|---|---|---|---|
| 7,512,122 B1 | 3/2009 | Olakangil et al. | |
| 8,219,675 B2* | 7/2012 | Ivershen | 709/224 |
| 2003/0196095 A1* | 10/2003 | Jeffries et al. | 713/181 |
| 2004/0032872 A1 | 2/2004 | Dhara | |
| 2004/0088571 A1* | 5/2004 | Jerrim et al. | 713/201 |
| 2004/0225885 A1* | 11/2004 | Grohoski et al. | 713/189 |
| 2005/0005023 A1 | 1/2005 | Dobbins et al. | |
| 2005/0021307 A1* | 1/2005 | Schneider | G06F 13/385 702/188 |
| 2010/0322076 A1* | 12/2010 | Goel | 370/236 |
| 2011/0145391 A1* | 6/2011 | Ivershen | H04L 43/026 709/224 |
| 2012/0057591 A1* | 3/2012 | Erman et al. | 370/389 |
| 2012/0147892 A1* | 6/2012 | Basso et al. | 370/392 |
| 2013/0266014 A1* | 10/2013 | Blomquist | H04L 45/7453 370/392 |
| 2013/0346719 A1* | 12/2013 | Tomlinson et al. | 711/165 |

OTHER PUBLICATIONS

Computer Networks, Fourth Edition, by Andrew S. Tanenbaum, Prentice Hall PTR (2003).*
Internet Archive Wayback Machine—Tektronix GeoProbe G10 product page, https://web.archive.org/web/20121214024831/http://www.frame.co.uk/product/network-monitoring.aspx#p7EPMc2_2 (Dec. 2012) (retrieved Mar. 31, 2016).*
U.S. Office Action dated Apr. 7, 2015 issued in U.S. Appl. No. 13/966,928.

* cited by examiner

*Primary Examiner* — Quang N Nguyen

(74) *Attorney, Agent, or Firm* — Scully, Scott, Murphy & Presser, P.C.; Rabin Bhattacharya, Esq.

(57) ABSTRACT

The present disclosure relates generally to the field of identifying network flows (e.g., IP flows) under network address translation. In various examples, identifying network flows (e.g., IP flows) under network address translation may be implemented in the form of systems and/or algorithms.

10 Claims, 7 Drawing Sheets

IDENTIFYING NETWORK FLOWS UNDER NETWORK ADDRESS TRANSLATION

BACKGROUND

The present disclosure relates generally to the field of identifying network flows (e.g., IP flows) under network address translation.

In various examples, identifying network flows (e.g., IP flows) under network address translation may be implemented in the form of systems and/or algorithms.

DESCRIPTION OF RELATED ART

Identifying the IP flows, that is, associating the individual IP packets with particular end-to-end flow (e.g., defined by 5-tuples), is one of the fundamental components in many tasks performed within IP networks (such tasks typically include analytics, network monitoring and management, intrusion detection, and other in-network packet processing). A common aspect of these tasks is that per-flow information needs to be gathered and analyzed through the inspection and processing of individual packets going through the processing elements deployed inside the network. In many of these applications, however, the in-network processing elements are deployed in multiple points in the network, where the results of the processing at different points need to be aggregated or matched between each other for further processing (necessitating the need to identify and match the flow that individual packets belong to when they are observed in different points in the network).

Correlation of IP flows captured at two or more observation points is conventionally done using the typical 5-tuple. Such a conventional approach to identifying the flow of each packet is simply reading the 5-tuple fields in the IP/TCP/UDP headers (i.e., source IP, destination IP, source port, destination port, and protocol number). However, many of today's networks of (e.g., ISPs, 3G/4G wireless networks, enterprise networks, data center networks, etc.) are deployed with network address translation ("NAT") systems (typically to address the issue of the insufficient number of public IP addresses to be allocated to all end-hosts inside the networks). In such systems, the end-hosts are allocated internally to private IP addresses behind the NAT device(s) located at the gateway location toward the public IP networks, and the addresses and/or port number of the packets from the end-hosts inside the network are translated ("NAT'ed") by the NAT device when they go out to the public network (and vice versa). As such, when the in-network processing elements are deployed at multiple points, particularly when some are deployed before the NAT device and some after NAT device, the 5-tuple fields seen by different processing elements at different observation points for the same packet can be different (e.g., depending on the location of the processing element in relative to the NAT device), making the flow identification much more difficult. That is, the typical 5-tuple cannot be used to correlate the IP flows because addresses and port numbers typically change.

SUMMARY

The present disclosure relates generally to the field of identifying network flows (e.g., IP flows) under network address translation.

In various examples, identifying network flows (e.g., IP flows) under network address translation may be implemented in the form of systems and/or algorithms.

In one embodiment, a computer readable storage medium, tangibly embodying a program of instructions executable by the computer for correlating a network flow seen at a plurality of observation points in a network is provided, the program of instructions, when executing, performing the following steps: obtaining by the computer, at a first one of the plurality of observation points, a packet of the network flow; extracting by the computer first information indicative of at least one invariant field of the packet obtained at the first observation point; obtaining by the computer, at a second one of the plurality of observation points, a modified version of the packet obtained at the first observation point, wherein the modified version of the packet has been modified by undergoing a network address translation process between the first observation point and the second observation point; extracting by the computer second information indicative of at least one invariant field of the modified packet obtained at the second observation point; comparing by the computer the first information and the second information, wherein the comparing produces a comparison result; and producing by the computer, based at least in part upon the comparison result, a mapping between: (a) the packet obtained at the first observation point; and (b) the modified packet obtained at the second observation point.

In another embodiment, a computer-implemented system for correlating a network flow seen at a plurality of observation points in a network is provided, the system comprising: a first packet obtaining element, wherein the first packet obtaining element is configured to obtain, at a first one of the plurality of observation points, a packet of the network flow; a first extracting element, wherein the first extracting element is in operative communication with the first packet obtaining element and the first extracting element is configured to extract first information indicative of at least one invariant field of the packet obtained at the first observation point; a second packet obtaining element, wherein the second packet obtaining element is configured to obtain, at a second one of the plurality of observation points, a modified version of the packet obtained at the first observation point, wherein the modified version of the packet has been modified by undergoing a network address translation process between the first observation point and the second observation point; a second extracting element, wherein the second extracting element is in operative communication with the second packet obtaining element and the second extracting element is configured to extract second information indicative of at least one invariant field of the modified packet obtained at the second observation point; a comparing element, wherein the comparing element is in operative communication with the first extracting element and the second extracting element, wherein the comparing element is configured to compare the first information and the second information, and wherein the comparing element is configured to produce a comparison result; and a mapping element, wherein the mapping element is in operative communication with the comparing element and wherein the mapping element is configured to produce, based at least in part upon the comparison result, a mapping between: (a) the packet obtained at the first observation point; and (b) the modified packet obtained at the second observation point.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

For the purposes of description the term "real-time" is intended to refer to cause and effect occurring approximately contemporaneously in time (e.g., without significant time lag between cause and effect but not necessarily instantaneously).

For the purposes of description, the term "observation point" is intended to refer to a physical location in a network where a packet can be obtained.

As described herein, mechanisms are provided for identifying and matching IP flows of IP packets observed at multiple locations in a network (where the addresses and/or port numbers of the packets are altered by NAT device(s) located between a plurality of observation points (sometimes referred to herein as "OPs")). In one example, the mechanisms operate by inferring the mapping (or "alteration") of the addresses (or 5-tuple in general) of the packets by the NAT device(s) from one address space to another, through the use of information contained in other fields of the packets (e.g., other fields of the headers and/or the payloads) that are not altered by the NAT device(s). Packet processing elements (sometimes referred to herein as "PPEs") at different observation points extract the information from invariant fields from the packets they observe, and exchange the information with each other to match different addresses of the same IP flow seen by each PPE. The PPEs may also identify the mapping performed by NAT device(s) between them.

In one specific example, the PPEs may be configured with the invariant fields to use (e.g., based on the network topology and deployed entities (e.g., NATs, proxies, etc.)). In another specific example, the PPEs can determine the invariant fields by exchanging a sequence of messages (e.g., well-known network-related messages) and identifying the field(s) that are not modified by the network entities between the PPEs.

Figure 1:
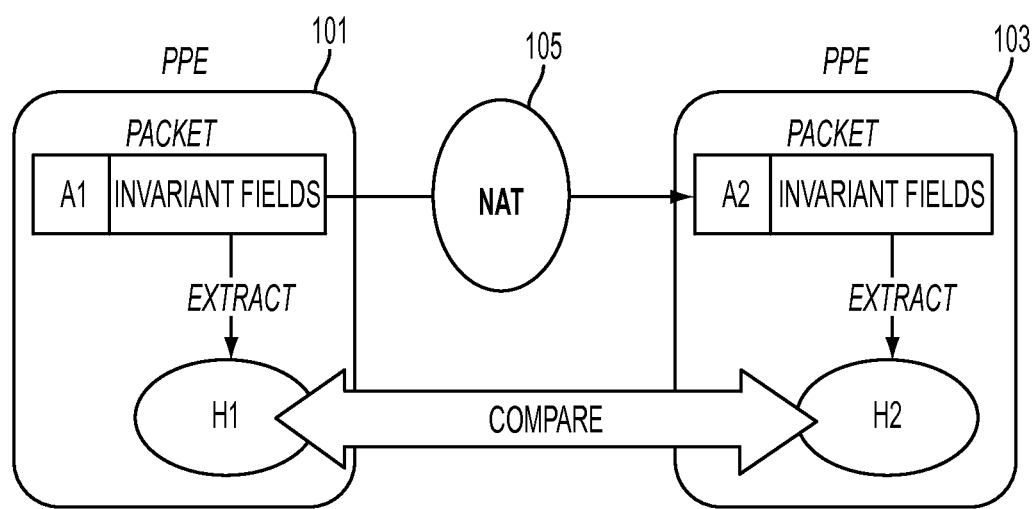
FIG. 1 depicts a block diagram of a processing technique according to an embodiment of the present invention.

Referring now to FIG. 1, an example embodiment in the context of two PPEs (shown as elements 101 and 103) and one NAT device (shown as element 105) placed between the PPEs is shown. Of note, while this example shows two PPEs and one NAT device, the same mechanism can be applied in a straightforward manner for other, general cases, that may involve: (a) more than two PPEs; and/or (b) more than one NAT device (e.g., "cascaded" NAT'ing) between the PPEs. Also, in this example it is assumed that the NAT'ing is performed on the IP address field of an end host behind the NAT device, but again, the same mechanism may be applied in cases with more general NAPT (Network Address and Port Translation).

It is seen that at a conceptual level, the inference of the address translation is done in the following steps: (1) upon seeing a packet of previously unknown address (and hence unknown address mapping information), each PPE extracts the information in the invariant field(s) of the packet (called 'hint'); (2) the hints generated by the PPEs are compared with each other; and (3) if the hints match, the two PPEs store the mapping between the addresses of the packet (seen by each PPE), from which the hints are extracted.

Still referring to FIG. 1, it is seen in particular that A1 and A2 denote the IP addresses of a packet seen by PPE 101 and PPE 103, respectively. Further, H1 and H2 denote the hints extracted from the corresponding packets by PPE 101 and PPE 103.

Each hint may be generated from any one or more field(s) of the packet which are not affected (i.e., altered) by NATing. In various examples such fields include (but are not limited to) the following: (a) fields in the IP header that are not subject to translation by NAT (e.g., packet length, header checksum, flags, protocol number, the source IP address if only the destination IP address is NAT'ed (and vice versa)); (b) fields in the TCP header that are not subject to translation by NAT (e.g., sequence number, acknowledgement number, window size, checksum, flags, the source port number if only the destination port number is NAT'ed (and vice versa)); (c) fields in the UDP header that are not subject to translation by NAT (e.g., length, checksum, the source port number if only the destination port number is NAT'ed (and vice versa)); and/or (d) the data field (i.e., payload) section of the IP, TCP, or UDP packet.

In one specific example, the information for each hint is extracted and compared as it is contained within the packet. In another specific example, (e.g., to improve the efficiency of the comparison), the extracted information may be "compressed" into a smaller size (using, for example, a consistent hashing of the data into a fixed size bit string).

Figure 2:
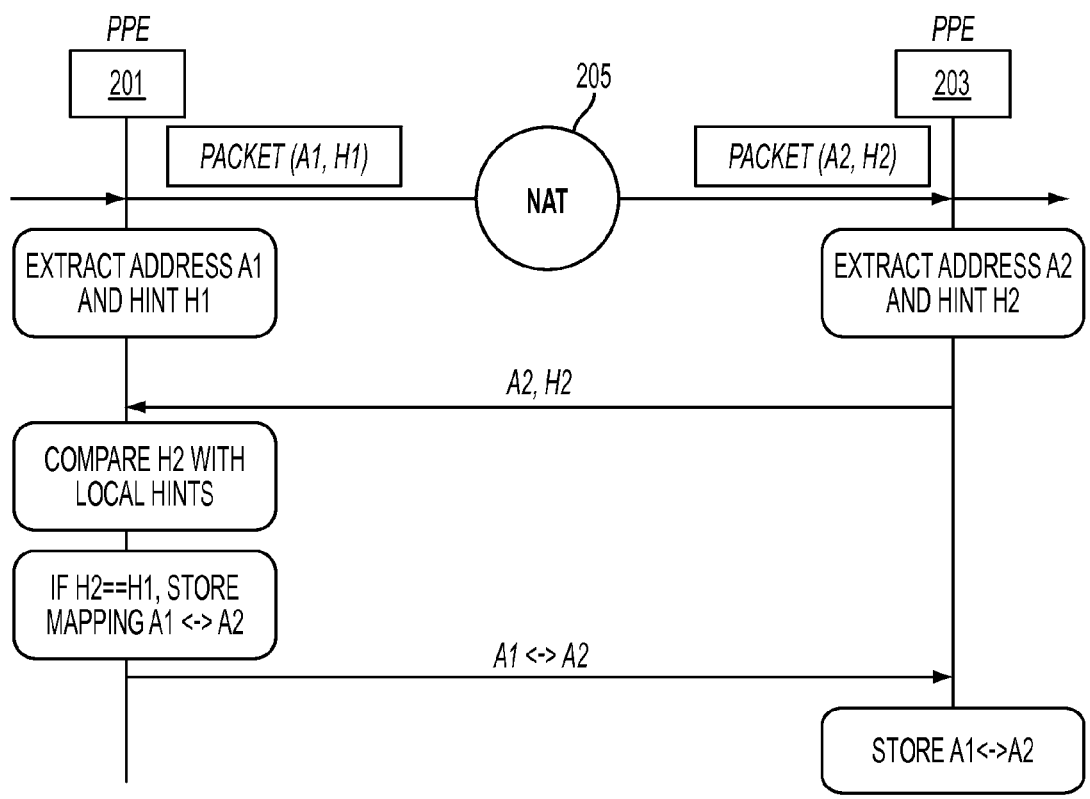
FIG. 2 depicts a block diagram of a processing technique according to an embodiment of the present invention.

Referring now to FIG. 2, a more detailed discussion of the hint comparison (see the "Compare" arrow in FIG. 1) will now be made. In this example, two PPEs 201 and 203 infer the mapping of an address A1 into the other A2, by comparing and matching the hints generated by a packet that goes through a NAT device 205 located between PPEs 201 and 203.

More particularly, to perform the comparison in this example, the following steps are performed by the PPEs: (1) upon seeing a packet of previously unknown address (and hence unknown address mapping information), each PPE 201 and 203 extracts a respective hint from the packet; (2) one of the PPEs (in this example, PPE 203) sends its extracted hint to the other PPE (in this example, PPE 201), along with the address that PPE 203 sees in the corresponding packet; (3) the PPE that receives the hint and the address (in this example PPE 201) from the other PPE (in this example, PPE 203) compares the received hint with the hints locally extracted from the packets it has seen. When a match of a hint is found, the receiving PPE (in this example PPE 201) stores the mapping of the two addresses (one seen locally and the other sent by the other PPE (in this example PPE 203)), and optionally sends the mapping back the other PPE (in this example PPE 203) to be notified of the match.

In one example, the PPE at the downstream location of the packet's direction (i.e., the one that sees the packet after the NAT is performed) will be the sender of the hint, and the other PPE will receive the hint and infer the address mapping by comparing the received and local hints. This allows a local hint at the receiving-side PPE to always exist when the hint is received from the other PPE that sees the corresponding packet at a later time. However, in other examples, the sending and receiving PPEs can be determined arbitrarily, or both PPEs send the hints to each other (these are particularly useful when the packet's directionality information is not readily available to PPEs) in which case the hints received from a peer PPE can be stored in a local buffer for some time period, and/or up to a certain number, so that the received hint(s) can be matched against the hint(s) locally generated at later times.

Regarding how many hints are compared for a given IP flow, in one example, only the first packet whose address is not known to the PPEs (i.e., the first packet of a given IP flow) is used to extract, exchange, and compare the hints to infer the address mapping. In order to improve the accuracy of the matching, however, in another example, the hints from several packets (e.g., the first few packets) of a given IP flow, for which the address mapping is not known, are extracted, exchanged, and compared (this is particularly useful when false positives and/or false negatives are possible in the matching of the hints, due to, e.g., the compression of the information extracted from the packets via hashing). In such case, the address mapping may be determined only when the matching is made at least for a certain number of hints (where, for example, the minimum number of matches to be made can be determined a priori).

In another example, the number of packets in a given IP flow from which the hint(s) are generated and sent from one PPE to a peer PPE is determined a priori by a constant (typically a small constant), so that the PPEs generate and compare the hints up to a certain number. In another example, the hints are extracted, exchanged, and compared until there is at least one IP flow (i.e., the address) for which the minimum number of matches are made—when such a match is found, the PPE that performs the comparison can notify its peer PPE of the match so that the peer can stop generating and sending the hints from the packets belonging to the given IP flow.

In another example, the field(s) in the packets and the methodology to be used to generate the hints are known a priori by both PPEs. In another example, the PPEs exchange a sequence of messages (e.g., well-defined a priori messages) to inform each peer PPE of the specific fields and methodology to be used to generate the hint. For example, the PPE that sends the hint(s) sends along the specific field and methodology used for the hint(s) being sent—this mechanism is particularly useful when some fields in the packets can possibly be modified by other network entities between the PPEs, helping to determine the fields to use as hints.

Figure 3A:
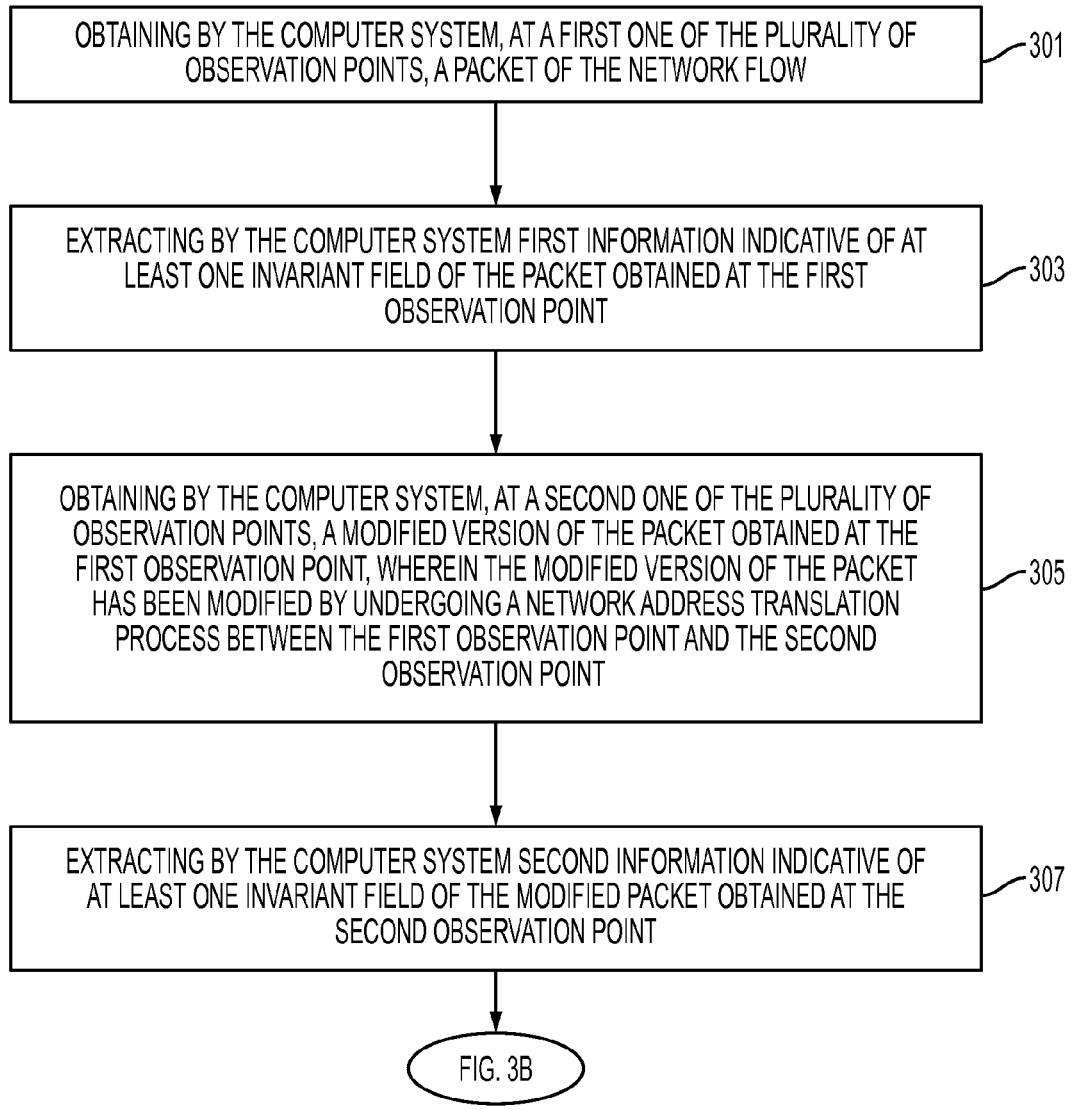
FIGS. 3A and 3B depict a flowchart of a method according to an embodiment of the present invention.
Figure 3B:
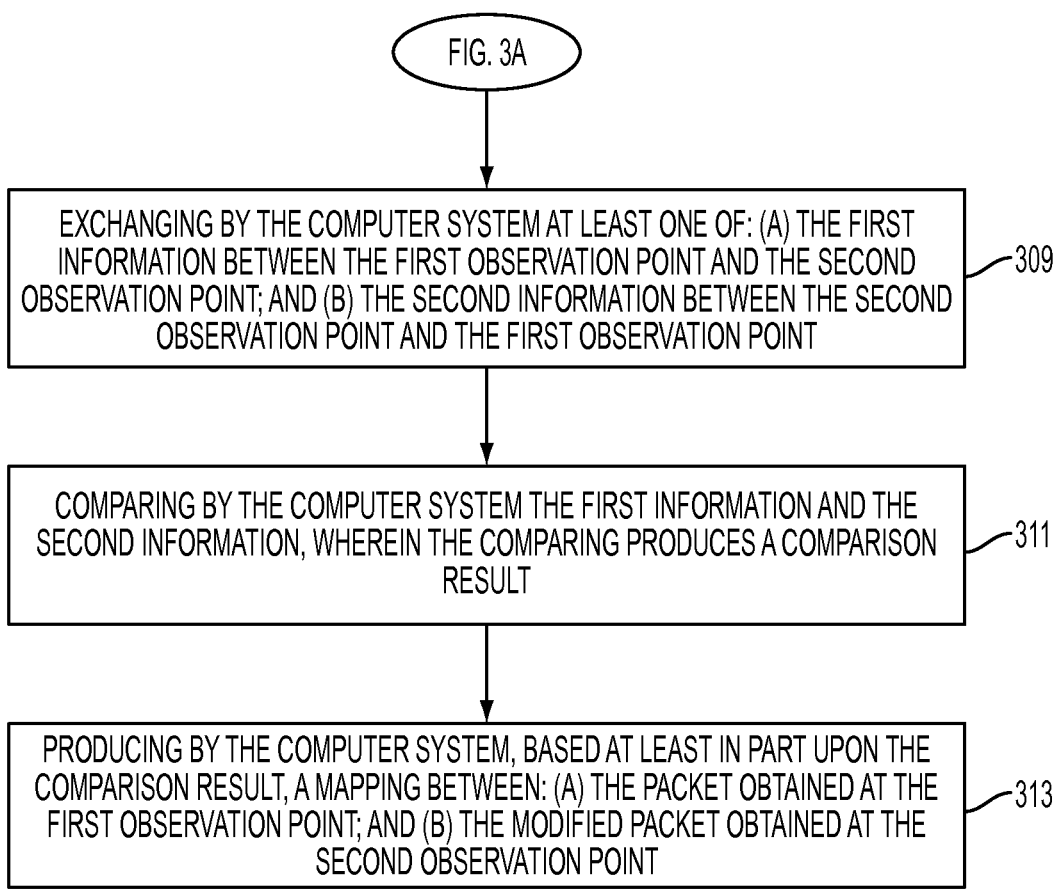

Referring now to FIGS. 3A and 3B, a method implemented in a computer system for correlating a network flow seen at a plurality of observation points in a network is shown. As seen in this FIG. 3, the method may comprise: at step 301—obtaining by the computer system, at a first one of the plurality of observation points, a packet of the network flow; at step 303—extracting by the computer system first information indicative of at least one invariant field of the packet obtained at the first observation point; at step 305—obtaining by the computer system, at a second one of the plurality of observation points, a modified version of the packet obtained at the first observation point, wherein the modified version of the packet has been modified by undergoing a network address translation process between the first observation point and the second observation point; at step 307—extracting by the computer system second information indicative of at least one invariant field of the modified packet obtained at the second observation point; at step 309—exchanging by the computer system at least one of: (a) the first information between the first observation point and the second observation point; and (b) the second information between the second observation point and the first observation point; at step 311—comparing by the computer system the first information and the second information, wherein the comparing produces a comparison result; and at step 313—producing by the computer system, based at least in part upon the comparison result, a mapping between: (a) the packet obtained at the first observation point; and (b) the modified packet obtained at the second observation point.

In one example, any steps may be carried out in the order recited or the steps may be carried out in another order.

Still referring to FIGS. 3A and 3B, any communications may be carried out via a network. Such a network may comprise the Internet, an intranet, a local area network, a wide area network and/or any other desired communication channel(s). In another example, some or all of the steps of FIGS. 3A and 3B may be implemented in a computer system of the type shown in FIG. 5.

Figure 4A:
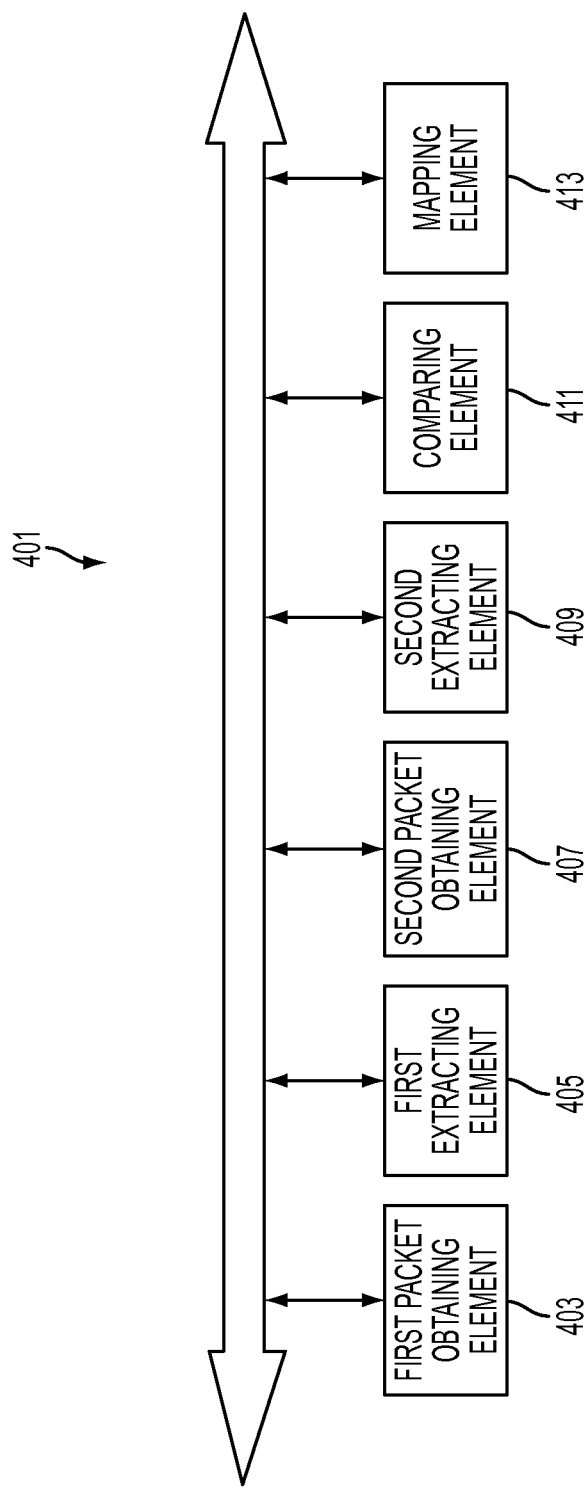
FIG. 4A depicts a block diagram of a system according to an embodiment of the present invention.

Referring now to FIG. 4A, a computer-implemented system 401 for correlating a network flow seen at a plurality of observation points in a network is shown. As seen in this FIG. 4A, the system 401 may comprise: a first packet obtaining element 403, wherein the first packet obtaining element is configured to obtain, at a first one of the plurality of observation points, a packet of the network flow; a first extracting element 405, wherein the first extracting element is in operative communication with the first packet obtaining element and the first extracting element is configured to extract first information indicative of at least one invariant field of the packet obtained at the first observation point; a second packet obtaining element 407, wherein the second packet obtaining element is configured to obtain, at a second one of the plurality of observation points, a modified version of the packet obtained at the first observation point, wherein the modified version of the packet has been modified by undergoing a network address translation process between the first observation point and the second observation point; a second extracting element 409, wherein the second extracting element is in operative communication with the second packet obtaining element and the second extracting element is configured to extract second information indicative of at least one invariant field of the modified packet obtained at the second observation point; a comparing element 411, wherein the comparing element is in operative communication with the first extracting element and the second extracting element, wherein the comparing element is configured to compare the first information and the second information, and wherein the comparing element is configured to produce a comparison result; and a mapping element 413, wherein the mapping element is in operative communication with the comparing element and wherein the mapping element is configured to produce, based at least in part upon the comparison result, a mapping between: (a) the packet obtained at the first observation point; and (b) the modified packet obtained at the second observation point.

In one example, any steps may be carried out in the order recited or the steps may be carried out in another order.

Still referring to FIG. 4A, any communications may be carried out via a network. Such a network may comprise the Internet, an intranet, a local area network, a wide area network and/or any other desired communication channel(s). In another example, some or all of the elements of FIG. 4A may be implemented in a computer system of the type shown in FIG. 5. Further, any element may be in operative communication with any other element(s).

Figure 4B:
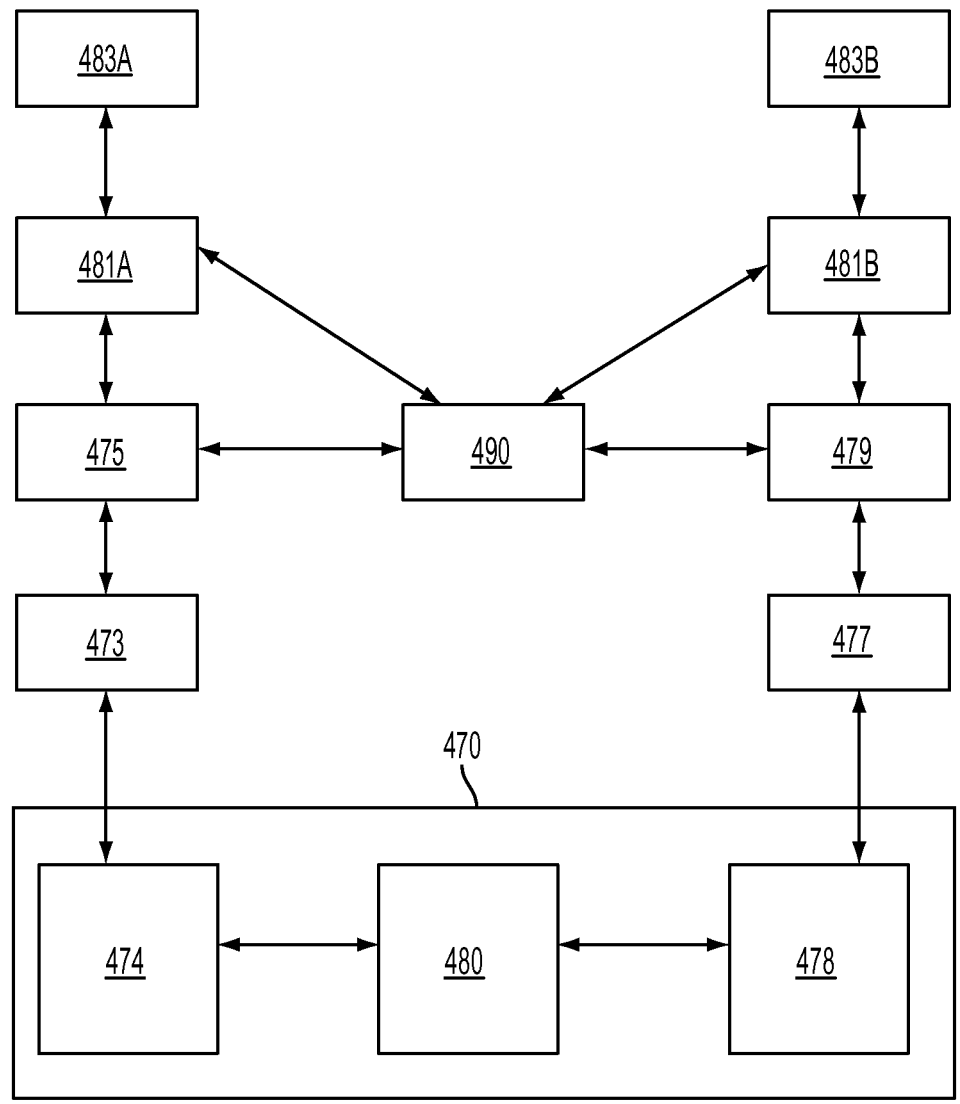
FIG. 4B depicts a block diagram of a system according to an embodiment of the present invention.

Referring now to FIG. 4B, a computer-implemented system for correlating a network flow seen at a plurality of observation points in a network 470 is shown. As seen in this FIG. 4B, the system may comprise: a first packet obtaining element 473, wherein the first packet obtaining element is configured to obtain, at a first one of the plurality of observation points 474, a packet of the network flow; a first extracting element 475, wherein the first extracting element is in operative communication with the first packet obtaining element and the first extracting element is configured to extract first information indicative of at least one invariant field of the packet obtained at the first observation point; a second packet obtaining element 477, wherein the second packet obtaining element is configured to obtain, at a second one of the plurality of observation points 478, a modified version of the packet obtained at the first observation point, wherein the modified version of the packet has been modified by undergoing a network address translation process by a network address translation device 480 between the first observation point and the second observation point; a second extracting element 479, wherein the second extracting element is in operative communication with the second packet obtaining element and the second extracting element is configured to extract second information indicative of at least one invariant field of the modified packet obtained at the second observation point; an exchanging element 490 in operative communication with the first extracting element and the first extracting element configured to exchange at least one of: (a) the first information; and (b) the second information; a first comparing element 481A, wherein the first comparing element is in operative communication with the first extracting element and the exchanging element, wherein the first comparing element is configured to compare the first information and the second information, and wherein the first comparing element is configured to produce a first comparison result; a second comparing element 481B, wherein the second comparing element is in operative communication with the second extracting element and the exchanging element, wherein the second comparing element is configured to compare the first information and the second information, and wherein the second comparing element is configured to produce a second comparison result; a first mapping element 483A, wherein the first mapping element is in operative communication with the first comparing element and wherein the first mapping element is configured to produce, based at least in part upon the first comparison result, a first mapping between the packet obtained at the first observation point with the modified packet obtained at the second observation point; and a second mapping element 483B, wherein the second mapping element is in operative communication with the second comparing element and wherein the second mapping element is configured to produce, based at least in part upon the second comparison result, a second mapping between the packet obtained at the first observation point with the modified packet obtained at the second observation point.

In one example, any steps may be carried out in the order recited or the steps may be carried out in another order.

Still referring to FIG. 4B, any communications may be carried out via a network. Such a network may comprise the Internet, an intranet, a local area network, a wide area network and/or any other desired communication channel(s). In another example, some or all of the elements of FIG. 4B may be implemented in a computer system of the type shown in FIG. 5. Further, any element may be in operative communication with any other element(s).

Figure 5:
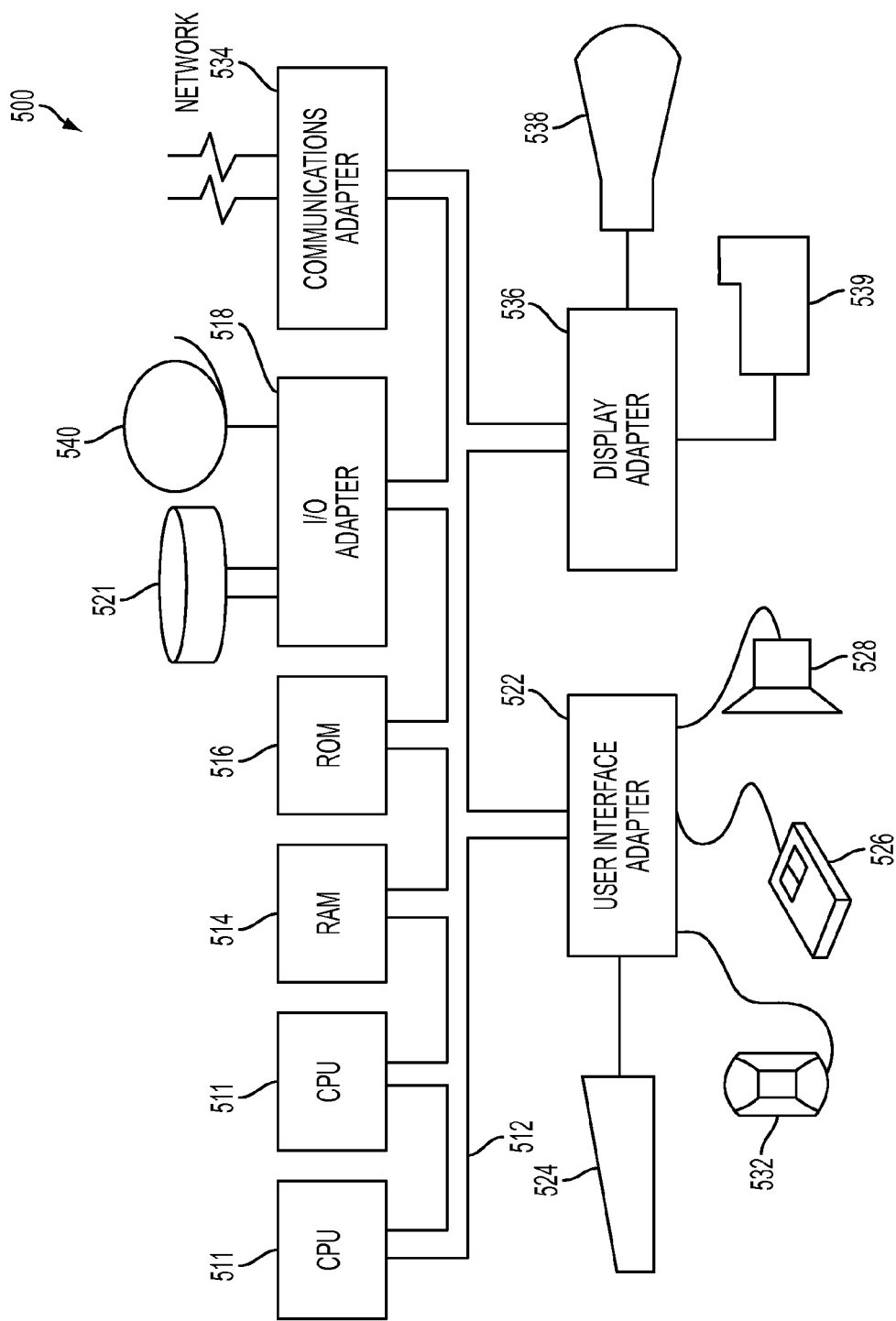
FIG. 5 depicts a block diagram of a system according to an embodiment of the present invention.

Referring now to FIG. 5, this figure shows a hardware configuration of computing system 500 according to an embodiment of the present invention. As seen, this hardware configuration has at least one processor or central processing unit (CPU) 511. The CPUs 511 are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communications adapter 534 for connecting the system 500 to a data processing network, the Internet, an Intranet, a local area network (LAN), etc., and a display adapter 536 for connecting the bus 512 to a display device 538 and/or printer 539 (e.g., a digital printer or the like).

In one embodiment, a method implemented in a computer system for correlating a network flow seen at a plurality of observation points in a network is provided, the method comprising: obtaining by the computer system, at a first one of the plurality of observation points, a packet of the network flow; extracting by the computer system first information indicative of at least one invariant field of the packet obtained at the first observation point; obtaining by the computer system, at a second one of the plurality of observation points, a modified version of the packet obtained at the first observation point, wherein the modified version of the packet has been modified by undergoing a network address translation process between the first observation point and the second observation point; extracting by the computer system second information indicative of at least one invariant field of the modified packet obtained at the second observation point; comparing by the computer system the first information and the second information, wherein the comparing produces a comparison result; and producing by the computer system, based at least in part upon the comparison result, a mapping between: (a) the packet obtained at the first observation point; and (b) the modified packet obtained at the second observation point.

In one example, the method further comprises exchanging by the computer system at least one of: (a) the first information between the first observation point and the second observation point; and (b) the second information between the second observation point and the first observation point.

In another example: (a) the first information comprises the at least one invariant field of the packet obtained at the first observation point; and (b) the second information comprises the at least one invariant field of the modified packet obtained at the second observation point.

In another example, each invariant field comprises one of: (a) a field in an IP header that is not subject to network address translation; (b) a field in a TCP header that is not subject to network address translation; (c) a field in an UDP header that is not subject to network address translation; and (d) information from a data field of the IP, TCP, or UDP packet.

In another example: (a) the field in the IP header that is not subject to network address translation comprises one of: (i) a packet length; (ii) a header checksum; (iii) a flag; (iv) a protocol number; (v) a source IP address if only a destination IP address has undergone network address translation; and (vi) a destination IP address if only a source IP address has undergone network address translation; (b) the field in the TCP header that is not subject to network address translation comprises one of: (i) a sequence number; (ii) an acknowledgement number; (iii) a window size; (iv) a checksum; (v) a flag; (vi) a source port number if only a destination port number has undergone network address translation; and (vii) a destination port number if only a source port number has undergone network address translation; (c) the field in the UDP header that is not subject to network address translation comprises one of: (i) a length; (ii) a checksum; (iii) a source port number if only the destination port number has undergone network address translation; and (iv) a destination port number if only a source port number has undergone network address translation; and (d) the information from the data field of the IP, TCP, or UDP packet comprises a signature of the data field.

In another example, the method further comprises: obtaining by the computer system, at the first observation point, a plurality of packets of the network flow; extracting by the computer system information indicative of at least one invariant field of each of the packets obtained at the first observation point; obtaining by the computer system, at a second one of the plurality of observation points, a plurality of modified versions of the packets obtained at the first observation point, wherein each of the modified versions of the packets has been modified by undergoing a network address translation process between the first observation point and the second observation point; extracting by the computer system information indicative of at least one invariant field of each of the modified packets obtained at the second observation point; comparing the information associated with each of the packets obtained at the first observation point with the information associated with each of the modified packets obtained at the second observation point; and producing, based at least in part upon the comparison of the information associated with each of the packets obtained at the first observation point with the information associated with each of the modified packets obtained at the second observation point, a mapping between: (a) the packets obtained at the first observation point; and (b) the modified packets obtained at the second observation point.

In another example, the mapping between: (a) the packet obtained at the first observation point; and (b) the modified packet obtained at the second observation point is produced when the comparison result indicates that a predetermined percentage of the invariant fields match.

In another embodiment, a computer readable storage medium, tangibly embodying a program of instructions executable by the computer for correlating a network flow seen at a plurality of observation points in a network is provided, the program of instructions, when executing, performing the following steps: obtaining by the computer, at a first one of the plurality of observation points, a packet of the network flow; extracting by the computer first information indicative of at least one invariant field of the packet obtained at the first observation point; obtaining by the computer, at a second one of the plurality of observation points, a modified version of the packet obtained at the first observation point, wherein the modified version of the packet has been modified by undergoing a network address translation process between the first observation point and the second observation point; extracting by the computer second information indicative of at least one invariant field of the modified packet obtained at the second observation point; comparing by the computer the first information and the second information, wherein the comparing produces a comparison result; and producing by the computer, based at least in part upon the comparison result, a mapping between: (a) the packet obtained at the first observation point; and (b) the modified packet obtained at the second observation point.

In one example, the program of instructions, when executing, further performs exchanging by the computer at least one of: (a) the first information between the first observation point and the second observation point; and (b) the second information between the second observation point and the first observation point.

In another example: (a) the first information comprises the at least one invariant field of the packet obtained at the first observation point; and (b) the second information comprises the at least one invariant field of the modified packet obtained at the second observation point.

In another example, each invariant field comprises one of: (a) a field in an IP header that is not subject to network address translation; (b) a field in a TCP header that is not subject to network address translation; (c) a field in an UDP header that is not subject to network address translation; and (d) information from a data field of the IP, TCP, or UDP packet.

In another example: (a) the field in the IP header that is not subject to network address translation comprises one of: (i) a packet length; (ii) a header checksum; (iii) a flag; (iv) a protocol number; (v) a source IP address if only a destination IP address has undergone network address translation; and (vi) a destination IP address if only a source IP address has undergone network address translation; (b) the field in the TCP header that is not subject to network address translation comprises one of: (i) a sequence number; (ii) an acknowledgement number; (iii) a window size; (iv) a checksum; (v) a flag; (vi) a source port number if only a destination port number has undergone network address translation; and (vii) a destination port number if only a source port number has undergone network address translation; (c) the field in the UDP header that is not subject to network address translation comprises one of: (i) a length; (ii) a checksum; (iii) a source port number if only the destination port number has undergone network address translation; and (iv) a destination port number if only a source port number has undergone network address translation; and (d) the information from the data field of the IP, TCP, or UDP packet comprises a signature of the data field.

In another example, the program of instructions, when executing, further performs the following steps: obtaining by the computer system, at the first observation point, a plurality of packets of the network flow; extracting by the computer system information indicative of at least one invariant field of each of the packets obtained at the first observation point; obtaining by the computer system, at a second one of the plurality of observation points, a plurality of modified versions of the packets obtained at the first observation point, wherein each of the modified versions of the packets has been modified by undergoing a network address translation process between the first observation point and the second observation point; extracting by the computer system information indicative of at least one invariant field of each of the modified packets obtained at the second observation point; comparing the information associated with each of the packets obtained at the first observation point with the information associated with each of the modified packets obtained at the second observation point; and producing, based at least in part upon the comparison of the information associated with each of the packets obtained at the first observation point with the information associated with each of the modified packets obtained at the second observation point, a mapping between: (a) the packets obtained at the first observation point; and (b) the modified packets obtained at the second observation point.

In another example, the mapping between: (a) the packet obtained at the first observation point; and (b) the modified packet obtained at the second observation point is produced when the comparison result indicates that a predetermined percentage of the invariant fields match.

In another embodiment, a computer-implemented system for correlating a network flow seen at a plurality of observation points in a network is provided, the system comprising: a first packet obtaining element, wherein the first packet obtaining element is configured to obtain, at a first one of the plurality of observation points, a packet of the network flow; a first extracting element, wherein the first extracting element is in operative communication with the first packet obtaining element and the first extracting element is configured to extract first information indicative of at least one invariant field of the packet obtained at the first observation point; a second packet obtaining element, wherein the second packet obtaining element is configured to obtain, at a second one of the plurality of observation points, a modified version of the packet obtained at the first observation point, wherein the modified version of the packet has been modified by undergoing a network address translation process between the first observation point and the second observation point; a second extracting element, wherein the second extracting element is in operative communication with the second packet obtaining element and the second extracting element is configured to extract second information indicative of at least one invariant field of the modified packet obtained at the second observation point; a comparing element, wherein the comparing element is in operative communication with the first extracting element and the second extracting element, wherein the comparing element is configured to compare the first information and the second information, and wherein the comparing element is configured to produce a comparison result; and a mapping element, wherein the mapping element is in operative communication with the comparing element and wherein the mapping element is configured to produce, based at least in part upon the comparison result, a mapping between: (a) the packet obtained at the first observation point; and (b) the modified packet obtained at the second observation point.

In another example, the system further comprises an exchanging element configured to exchange at least one of: (a) the first information between the first observation point and the second observation point; and (b) the second information between the second observation point and the first observation point.

In another example: (a) the first information comprises the at least one invariant field of the packet obtained at the first observation point; and (b) the second information comprises the at least one invariant field of the modified packet obtained at the second observation point.

In another example, each invariant field comprises one of: (a) a field in an IP header that is not subject to network address translation; (b) a field in a TCP header that is not subject to network address translation; (c) a field in an UDP header that is not subject to network address translation; and (d) information from a data field of the IP, TCP, or UDP packet.

In another example: (a) the field in the IP header that is not subject to network address translation comprises one of: (i) a packet length; (ii) a header checksum; (iii) a flag; (iv) a protocol number; (v) a source IP address if only a destination IP address has undergone network address translation; and (vi) a destination IP address if only a source IP address has undergone network address translation; (b) the field in the TCP header that is not subject to network address translation comprises one of: (i) a sequence number; (ii) an acknowledgement number; (iii) a window size; (iv) a checksum; (v) a flag; (vi) a source port number if only a destination port number has undergone network address translation; and (vii) a destination port number if only a source port number has undergone network address translation; (c) the field in the UDP header that is not subject to network address translation comprises one of: (i) a length; (ii) a checksum; (iii) a source port number if only the destination port number has undergone network address translation; and (iv) a destination port number if only a source port number has undergone network address translation; and (d) the information from the data field of the IP, TCP, or UDP packet comprises a signature of the data field.

In another example: the first packet obtaining element is configured to obtain, at the first observation point, a plurality of packets of the network flow; the first extracting element is configured to extract information indicative of at least one invariant field of each of the packets obtained at the first observation point; the second packet obtaining element is configured to obtain, at a second one of the plurality of observation points, a plurality of modified versions of the packets obtained at the first observation point, wherein each of the modified versions of the packets has been modified by undergoing a network address translation process between the first observation point and the second observation point; the second extracting element is configured to extract information indicative of at least one invariant field of each of the modified packets obtained at the second observation point; the comparing element is configured to compare the information associated with each of the packets obtained at the first observation point with the information associated with each of the modified packets obtained at the second observation point; and the mapping element is configured to produce, based at least in part upon the comparison of the information associated with each of the packets obtained at the first observation point with the information associated with each of the modified packets obtained at the second observation point, a mapping between: (a) the packets obtained at the first observation point; and (b) the modified packets obtained at the second observation point.

In another example, the mapping between: (a) the packet obtained at the first observation point; and (b) the modified packet obtained at the second observation point is produced when the comparison result indicates that a predetermined percentage of the invariant fields match.

In another embodiment, a mechanism for correlating a network data flow seen at two or more observation points comprises: (a) extracting, at each observation point, one or more invariant fields of the data flow; (b) exchanging the observed invariant field(s) (and/or data indicative of the observed invariant field(s)) between the observation points; and (c) comparing the exchanged invariant fields (and/or data indicative of the observed invariant field(s)) and producing a mapping between data flows seen at the observation points.

In one specific example, the extracting may be carried out upon receipt of a first packet of the data flow at a given observation point. In another specific example, the extraction, comparison and mapping process may be extended to the first N packet(s) of a data flow, wherein N is an integer of 1 or greater.

In one specific example, the invariant field(s) may comprise one or more of: packet length(s), sequence number(s), checksum(s), and/or payload signature(s).

In one specific example, the exchanging observed invariant field(s) (and/or data indicative of the observed invariant field(s)) may be a one way exchange (e.g., from a first observation point to a second observation point) or two way exchange (e.g., from a first observation point to a second observation point and from the second observation point to the first observation point).

In one specific example, the mapping may be produced if the comparing indicates that all invariant field(s) (and/or data indicative of the observed invariant field(s)) match. In another specific example, the mapping may be produced if the comparing indicates that a certain percentage of invariants field(s) (and/or data indicative of the observed invariant field(s)) match. In another specific example, the mapping may be produced if the comparing indicates that a certain number of packets belonging to the same data flow match. In another example, a match may be an exact match or within a certain threshold or accuracy (e.g., less than 100%).

As described herein, various embodiments may be applied in the context of wireless communications, wireless/mobile networking and/or telecommunications networks. For example, in 3G/4G networks a NAT device is typically placed between an edge network element (e.g., base stations and RNC (Radio Network Controller)) and a core network element (e.g., GGSN (Gateway GPRS Support Node)), making it difficult (using conventional techniques) to correlate IP flows captured at the core and at the edge of the network. Such correlation of IP flows captured at the core and at the edge of the network may be provided by various embodiments.

Further, in various examples, correlation of network flows needed for: (a) mobility support for byte-caching; and/or (b) for real-time analytics may be provided.

As described herein, various embodiments provide for correlation of network flows using a number of packet field(s) that remain unchanged (that is, are invariant) as packets traverse the NAT device(s).

In various examples, invariant fields may comprise one or more of: (a) fields in the IP header that are not subject to the translation by NAT (e.g., packet length, header checksum, flags, protocol number, the source IP address if only the destination IP address is NAT'ed, and/or the destination IP address if only the source IP address is NAT'ed); (b) fields in the TCP header that are not subject to the translation by NAT (e.g., sequence number, acknowledgement number, window size, checksum, flags, the source port number if only the destination port number is NAT'ed; and/or the destination port number if only the source port number is NAT'ed; (c) fields in the UDP header that are not subject to the translation by NAT (e.g., length, checksum, the source port number if only the destination port number is NAT'ed; and/or the destination port number if only the source port number is NAT'ed; and/or (d) the data field (i.e., payload) section of the IP, TCP, or UDP packet, by producing a signature of the payload (e.g., using SHA1 for example).

As described herein, various embodiments provide for real-time correlations of network flows (e.g., upon the arrival of a new uncorrelated data flow: (a) an exchange between two or more observation points of one or more invariant fields of the new uncorrelated data flow is performed; and (b) the exchanged field(s) (and/or data indicative of the observed invariant field(s)) are compared).

As described herein, various embodiments may be applied in the context of peering locations.

As described herein, various embodiments provide for correlating IP flows through a NAT, wherein the correlation is performed on an end-to-end basis without presuming access to the NAT box.

As described herein, various embodiments may identify and match the IP flows of the IP packets observed at multiple locations in a network, where the addresses and/or port numbers of the packets are altered by network address translation devices located between the observation points. In various examples, 100% accuracy is not required (which would not necessarily be possible), but effective results may be provided regardless of the occasional failure of the hint(s) to provide a correct positive or negative match.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A non-transitory storage device for correlating a network flow seen at a plurality of observation points in a network, the storage device comprising program instructions that, when executing, configure a first processing element at a first one of the plurality of observation points to perform:
   obtaining a first packet of the network flow;
   extracting one or more invariant fields from the first packet;
   sending a first address of the first packet and information of the one or more invariant fields of the first packet to a second processing element at a second one of the plurality of observation points,
   wherein the program instructions configure the first processing element to perform the extracting the one or more invariant fields of the first packet and the sending the first address in response to the first address being unknown,
   wherein the program instructions further configure the second processing element to perform:
   receiving the first address of the first packet and the information of the one or more invariant fields of the first packet;
   obtaining locally a second packet of the network flow;
   extracting one or more invariant fields from the second packet;
   comparing each of the one or more invariant fields received from the first processing element with a corresponding one of the one or more invariant fields obtained by the second processing element;
   determining a match between the first address of the first packet and a second address of the second packet based on a determination of the one or more invariant fields of the first packet being matched with the one or more invariant fields of the second packet within a predetermined percentage; and
   notifying the first processing element of the match between the first address of the first packet and the second address of the second packet,
   wherein the program instructions configure the second processing element to perform the extracting the one or more invariant fields of the second packet, the sending the second address, the comparing, and the determining the match, and the notifying, in response to the second address being unknown.

2. The storage device of claim 1, wherein each invariant field comprises at least one of:
   (a) a field in an IP header that is not subject to network address translation;
   (b) a field in a TCP header that is not subject to network address translation;
   (c) a field in an UDP header that is not subject to network address translation; and
   (d) information from a data field of the IP, TCP, or UDP packet.

3. The storage device of claim 2, wherein:
   (a) the field in the IP header that is not subject to network address translation comprises at least one of: (i) a packet length; (ii) a header checksum; (iii) a flag; (iv) a protocol number; (v) a source IP address if only a destination IP address has undergone network address translation; and (vi) a destination IP address if only a source IP address has undergone network address translation;

(b) the field in the TCP header that is not subject to network address translation comprises at least one of: (i) a sequence number; (ii) an acknowledgement number; (iii) a window size; (iv) a checksum; (v) a flag; (vi) a source port number if only a destination port number has undergone network address translation; and (vii) a destination port number if only a source port number has undergone network address translation;

(c) the field in the UDP header that is not subject to network address translation comprises at least one of: (i) a length; (ii) a checksum; (iii) a source port number if only the destination port number has undergone network address translation; and (iv) a destination port number if only a source port number has undergone network address translation; and (d) the information from the data field of the IP, TCP, or UDP packet comprises a signature of the data field.

4. The storage device of claim 1, wherein the program instructions further configure at least one of the first and second processing elements to perform:
storing mapping information between the first address and the second address.

5. The storage device of claim 1, wherein the program instructions further configure the first processing element to perform:
stopping sending of one or more invariant fields associated with a third packet belonging to the network flow to the second processing element.

6. A computer-implemented system for correlating a network flow seen at a plurality of observation points in a network, the system comprising:
a hardware processor, associated with a first one of the plurality of observation points, configured to:
obtain a first packet of the network flow;
extract one or more invariant fields from the first packet in response to a first address being unknown; and
send the first address of the first packet and information of the one or more invariant fields of the first packet to another hardware processor associated with a second one of the plurality of observation points in response to the first address being unknown,
wherein the system further comprising:
the another hardware processor configured to:
obtain a second packet of the network flow;
extract one or more another invariant fields from the second packet in response to a second address of the second packet being unknown;
compare each of the one or more invariant fields of the first packet received from the hardware processor with a corresponding one of the one or more invariant fields of the second packet obtained by the another hardware processor in response to the second address being unknown;

determine a match between the first address of the first packet and the second address of the second packet based on a determination of the one or more invariant fields of the first packet being matched with the one or more invariant fields of the second packet within a predetermined percentage in response to the second address being unknown; and
notify the hardware processor of the match between the first address of the first packet and the second address of the second packet in response to the second address being unknown.

7. The system of claim 6, wherein each invariant field comprises at least one of:
(a) a field in an IP header that is not subject to network address translation;
(b) a field in a TCP header that is not subject to network address translation;
(c) a field in an UDP header that is not subject to network address translation; and
(d) information from a data field of the IP, TCP, or UDP packet.

8. The system of claim 6, wherein:
(a) the field in the IP header that is not subject to network address translation comprises at least one of: (i) a packet length; (ii) a header checksum; (iii) a flag; (iv) a protocol number; (v) a source IP address if only a destination IP address has undergone network address translation; and (vi) a destination IP address if only a source IP address has undergone network address translation;

(b) the field in the TCP header that is not subject to network address translation comprises at least one of: (i) a sequence number; (ii) an acknowledgement number; (iii) a window size; (iv) a checksum; (v) a flag; (vi) a source port number if only a destination port number has undergone network address translation; and (vii) a destination port number if only a source port number has undergone network address translation;

(c) the field in the UDP header that is not subject to network address translation comprises at least one of: (i) a length; (ii) a checksum; (iii) a source port number if only the destination port number has undergone network address translation; and (iv) a destination port number if only a source port number has undergone network address translation; and (d) the information from the data field of the IP, TCP, or UDP packet comprises a signature of the data field.

9. The system of claim 6, wherein at least one of the hardware processor and the another hardware processor is configured to store mapping information between the first address and the second address.

10. The system of claim 6, wherein the hardware processor is configured to stop sending of one or more invariant fields associated a third packet belonging to the network flow to the another hardware processor.

* * * * *